United States Patent Office.

MARY J. HANSON, OF MAUSTON, WISCONSIN.

Letters Patent No. 98,959, dated January 18, 1870.

IMPROVED MEDICAL COMPOUND.

The Schedule referred to in these Letters Patent and making part of the same.

To all whom it may concern:

Be it known that I, Mrs. MARY J. HANSON, of Mauston, in the county of Juneau, and State of Wisconsin, have invented a new and improved Medical Compound; and I do hereby declare that the following is a full, clear, and exact description thereof, which will enable others skilled in the art to make and use the same.

My invention has for its object to furnish an improved medical compound, simple in its ingredients and preparation, and very effective for the cure of cholera-morbus, diarrhœa, dysentery, colic, and similar diseases of the bowels; and It consists of the compound, composed of the ingredients, and prepared in the manner hereinafter more fully described.

This compound is composed of the ingredients used in about the proportions as follows:

Opium, one ounce;
Rhubarb, one ounce;
Blood-root, one ounce;
Dandelion-root, one ounce;
Black-cherry bark, two ounces; and
Oil of sassafras, one ounce.

In preparing this compound, I slice the opium, pour upon it one gill of boiling water, work it in a mortar until dissolved, then add half a pint of alcohol, let it stand twenty-four hours, and strain it. Next, I pulverize the blood-root, dandelion-root, and black-cherry bark, add the rhubarb, pour upon the mixture one and a half gallon of boiling water, steep it thoroughly from four to five hours, strain it, add two pounds of loaf-sugar, and simmer it down to one gallon. Then I add the previously-prepared tincture of opium, the oil of sassafras, and one and a half pint of alcohol, and the compound is ready for use or bottling.

Having thus described my invention,

I claim as new, and desire to secure by Letters Patent—

An improved medical compound, prepared of the ingredients, and in about the proportions, and in the manner substantially as herein set forth and described.

The above specification of my invention signed by me, this 27th day of November, 1869.

MRS. MARY J. HANSON.

Witnesses:
I. G. PARKER,
O. T. OLSON.